US007177979B2

(12) United States Patent
Kuwamura (10) Patent No.: US 7,177,979 B2
(45) Date of Patent: *Feb. 13, 2007

(54) METHOD FOR PREVENTING DATA LOSS DUE TO REPEATED WRITES TO A GIVEN TRACK ON A MAGNETIC DISK DRIVE

(75) Inventor: Nobuhiro Kuwamura, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 300 days.

This patent is subject to a terminal disclaimer.

(21) Appl. No.: 10/674,763

(22) Filed: Sep. 29, 2003

(65) Prior Publication Data

US 2004/0193798 A1    Sep. 30, 2004

(30) Foreign Application Priority Data

Mar. 11, 2003    (JP)    ............................. 2003-064974

(51) Int. Cl.
*G06F 12/00* (2006.01)
*G11B 15/04* (2006.01)

(52) U.S. Cl. ........................................ 711/112; 360/60
(58) Field of Classification Search ................ 711/112; 360/60
See application file for complete search history.

(56) References Cited

U.S. PATENT DOCUMENTS 6,462,896 B1 * 10/2002 Codilian et al. ............... 360/48

2002/0138692 A1 * 9/2002 Gerhart ........................ 711/112

FOREIGN PATENT DOCUMENTS

| JP | 05334015 A | * 12/1993 |
| JP | 06-236504 | 8/1994 |
| JP | 2001-338468 | 12/2001 |
| JP | 2001-350596 | 12/2001 |

* cited by examiner

*Primary Examiner*—Matthew Kim
*Assistant Examiner*—Shane M. Thomas
(74) *Attorney, Agent, or Firm*—Townsend and Townsend and Crew LLP (57) ABSTRACT

Where a leakage magnetic field deletes data on adjacent tracks gradually, such deletion is compensated so as to prevent data errors from occurring. A magnetic disk device includes one or more magnetic disks, one or more magnetic heads, and a write and read circuit for writing or reading data, and writes or reads the data on tracks on the magnetic disks. The number of writes of the data on a given track is acquired. If the number of writes reaches a predetermined number, the data on the tracks adjacent to a given track is read out once and, then, the data is rewritten on the adjacent tracks. Further, when the data is written on the tracks, the data is written on alternate physical tracks and every other track is skipped, and after the data is written on half of all tracks, the data is written on the skipped tracks.

14 Claims, 5 Drawing Sheets

Area number 0
Area number 1
Area number 2
Area number (z-1)
Area number z

FIG.9

| Area number | Number of write on even-numbered physical tracks | Number of write on odd-numbered physical tracks |
|---|---|---|
| 0 | even [0] | odd [0] |
| 1 | even [1] | odd [1] |
| 2 | even [2] | odd [2] |
| 3 | even [3] | odd [3] |
| : | : | : |
| z-1 | even [z-1] | odd [z-1] |
| z | even [z] | odd [z] |

METHOD FOR PREVENTING DATA LOSS DUE TO REPEATED WRITES TO A GIVEN TRACK ON A MAGNETIC DISK DRIVE

CROSS-REFERENCE TO RELATED APPLICATION

This application claims priority from Japanese Application No. 2003-064974, filed Mar. 11, 2003, the entire disclosure of which is incorporated by reference for all purposes.

BACKGROUND OF THE INVENTION

This application relates generally to magnetic recording and more specifically to a technique for preventing a data loss as a result of deletion of data on adjacent tracks that may occur when data on a given track is written repeatedly in a magnetic disk device.

In recent years, as magnetic disk devices achieve widespread use not only in the field of computer technology but also in another application such as hard disk recorders in place of video tape recorders, the need to increase capacity of the magnetic disk devices, which are random-accessible large-capacity storage units, grows increasingly.

Figure 2:
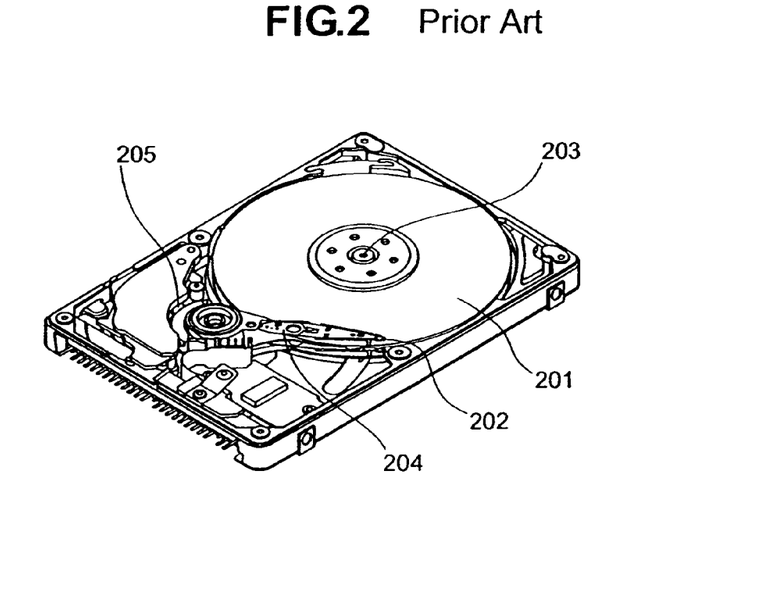
FIG. 2 is a diagram schematically showing a mechanism of a typical magnetic disk device.

FIG. 2 shows a mechanism of a typical magnetic disk device. The disk device comprises: one or more magnetic disks 201, each of which consists of a disk of a non-magnetic material such as glass on which a magnetic layer is laminated; write heads for writing data to the magnetic disks; and read heads for reading data from the magnetic disks. Typically, pairs of one write head and one read head constitute an integrated magnetic head construction 202. The magnetic disks 201 are held on a single spindle 203. The heads 202 whose number corresponds to the number of surfaces of the magnetic disks are attached to arms 204. The arms 204 are configured so that they can be moved onto the disk surfaces by a VCM (voice coil motor) 205.

Figure 3:
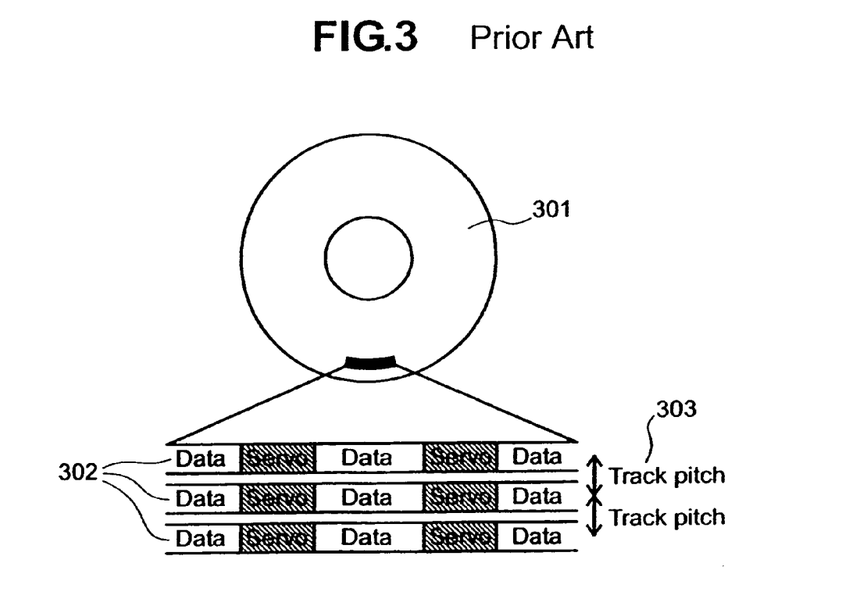
FIG. 3 is a conceptual diagram showing the placement of tracks on a typical magnetic disk.

In the magnetic disk device, data is written and read on areas disposed on the disk as concentric circles, which are called tracks. FIG. 3 shows the placement of the tracks 302 on the magnetic disk 301. The tracks 302 are disposed so that they are typically spaced uniformly from each other by a track pitch 303 and each track 302 consists of servo areas where information that is needed for positioning the heads and data areas to/from which a user can write/read data. Further, each data area can be divided into minimum accessible units called sectors.

Figure 4:
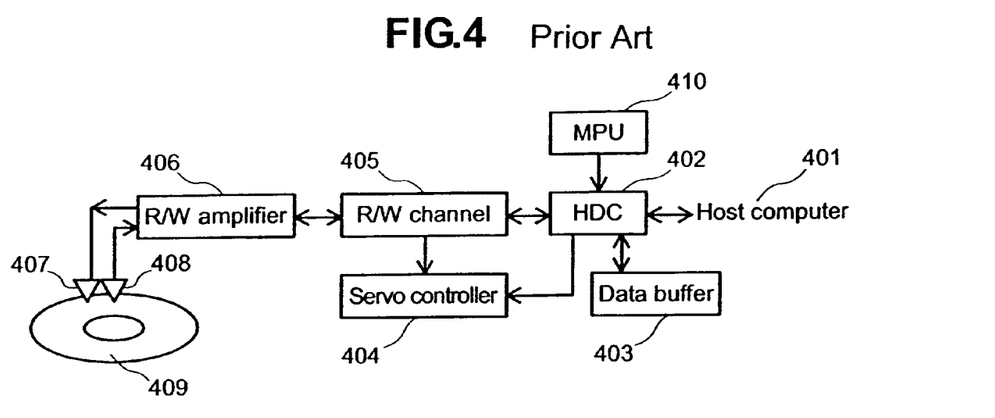
FIG. 4 is a diagram showing a configuration for reading and writing the data in a typical magnetic disk device.

FIG. 4 shows basic components required for writing/reading data on/from the magnetic disk device. When the data is written, the data is sent from a host computer 401 to a hard disk controller (HDC) 402. The HDC 402 determines an address or the head, track and sector number to which the data is written and issues a command to a servo controller 404 to move a write head 407 to a specified sector position. Based on servo information that is written on the magnetic disk 409 and obtained via a R/W amplifier 406 and a R/W channel 405, the servo controller 404 moves the write head to the track in which the desired sector resides.

The HDC 402 outputs the write data to the R/W channel 405 in synchronization with the sector specified on the track of the rotating magnetic disk 409. The write data is encoded into a format suitable for writing in the R/W channel 405 and the R/W amplifier 406 and, then, the encoded write date is written on the magnetic disk 409 by a write head 407. Here, it is to be noted that the data from the host computer is typically stored in a data buffer 403 once and, then, sent from the data buffer 403 to the R/W channel when the writing is ready.

Also when the data is read, the head is positioned on the track where the desired sector resides in a manner similar to the one when the data is written. After the head has been positioned, the data is read from the magnetic disk 409 by a read head 408 in synchronization with the specified sector, the read waveform is decoded into the original data by the R/W amplifier 406 and the R/W channel 405 and, then, the decoded data is sent to the HDC 402. Finally, the HDC 402 outputs the data to the host computer.

The data is written or read in the procedure described above. The addresses specified by the host computer when it accesses the magnetic disk device are called logical addresses, which are not always the same as physical addresses or actual addresses on the disk. A MPU 410 calculates the corresponding physical addresses from the logical addresses specified by the host computer 401 and the actual write/read operation is performed on the addresses. When the magnetic disk device is accessed sequentially, the data is written or read in the order of logical addresses.

In order to meet the requirement for increasing the storage capacity in the magnetic disk device configured as described above, various attempts are made to improve the recording density such as by increasing a track recording density of the disk, which is a density in the circumferential direction, or by reducing the track width as well as the track pitch to increase the track density.

Figure 5:
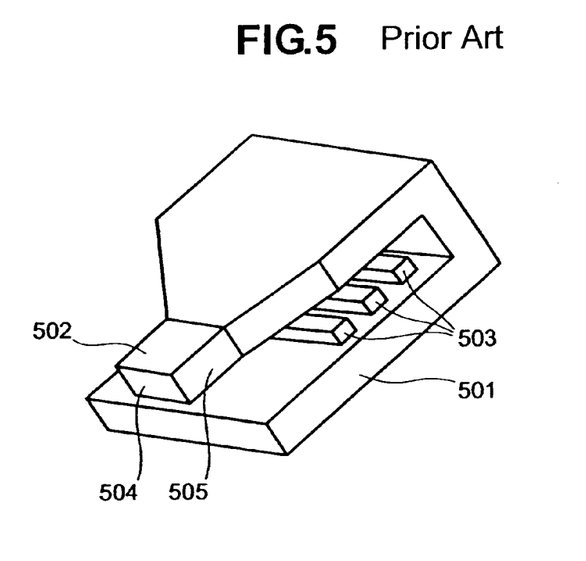
FIG. 5 is a diagram schematically showing a structure of a write head in a typical magnetic disk device.

FIG. 5 shows a structural schematic view of the write head. When a coil 503 is energized, a magnetic field is generated between a floating upper surface portion 504 of a head of an upper pole piece 502 and a lower pole piece 501 and, then, as this magnetic field magnetizes the magnetic disk surface, the data is written. However, as the track width is made narrower so as to increase the recording density as described above, the tip portion of the write head becomes narrower, and the tip portion may be saturated by the magnetic field. As a result, the magnetic field may not only be generated at the floating upper surface portion 504 as it should be, but may also from side surfaces 505. Further, when the track pitch is narrow, this leakage magnetic field from the side surfaces may be spread to adjacent tracks. Since the leakage magnetic field is weaker than the main write magnetic field to write the data, even if the leakage magnetic field is spread to the adjacent tracks, the data on the adjacent tracks may not be affected immediately. However, as the adjacent tracks are exposed to the leakage magnetic field multiple times, the data on the adjacent tracks may be deleted little by little and, eventually, the data may become unreadable.

In order to avoid the data loss on the adjacent tracks due to the leakage magnetic field, examples of possible measures include:

(1) increasing the coercive force of the magnetic disk so that the data is not liable to be deleted even if there is the leakage magnetic field from the adjacent tracks;
(2) configuring the write head such that the leakage magnetic field is not liable to be generated;
(3) reducing the amount of the leakage magnetic field to which the adjacent tracks are exposed by increasing the track pitch; and
(4) reducing the amount of the leakage magnetic field itself by adjusting the magnitude of the current applied to the write head when the data is written or an amount of overshoot of the write current waveform.

Further, in a prior art example, under the circumstance where it is required to increase the track density TPI so that the recording density of the recording media can be improved and, due to the high TPI, both new and old versions of the write data may coexist together in a unitary storage area, an improvement has been proposed wherein incorrect data that may result from reading the old data can be inhibited (for example, see Japanese Patent Laid-open No 2001-338468).

Still further, in another prior art example, paying attention to the high correlation of a failure frequency of storage units with the number of accesses and total energizing time, a technique has been proposed for storing an operation history of a main storage unit every time the main storage unit is operated and, based on this operation history, determining the possibility that the failure may occur in the main storage unit (for example, see Japanese Patent Laid-open No. 2001-350596).

Although the methods for inhibiting the data loss in the adjacent tracks due to the leakage magnetic field have been proposed as described above, if the coercive force of the disk is increased as discussed in item (1), the data on the adjacent tracks becomes less liable to be deleted but it also becomes difficult to overwrite the data as it should be and thus the overwrite characteristic is degraded, which may result in a poor error rate of the data that should be overwritten. On the other hand, with regard to item (2), the construction of the write head that is effective in inhibiting the leakage magnetic field has not been sufficiently apparent up to the present and this problem should be addressed in the future.

Further, if the measure described in item (3) is adopted, in order to ensure the storage capacity per disk, the track recording density must be increased in proportion to the track pitch, but the higher track recording density may result in reduced resolution and S/N ratio of the readout waveform, thereby increasing the error rate. Still further, with regard to the setting of the write current value and the adjustment of the overshoot of the write current as discussed in item (4), if such measures are taken so that the leakage magnetic field will not occur or, more specifically, if the write current value is set to a smaller value or the amount of overshoot is reduced, the data itself may be written insufficiently and, consequently, the error rate may be increased just as in the case described with regard to item (1).

Still further, although the improvement measures against the failure of the data written on the storage media have been proposed in Japanese Patent Laid-open No 2001-338468 and Japanese Patent Laid-open No. 2001-350596 as described above, these measures do not address the data loss on the adjacent tracks due to the leakage magnetic field.

SUMMARY OF THE INVENTION

The present invention provide techniques for protecting a magnetic disk device from data loss of the sort caused by a leakage magnetic field generated during writing on adjacent tracks.

Embodiments of the present invention operate in the context of a magnetic disk device where a magnetic head writes data on concentric tracks on a surface of a magnetic disk, the tracks include a first plurality of first-parity-numbered (i.e., even- or odd-numbered) tracks and a second plurality of second-parity-numbered (i.e., odd- or even-numbered) tracks interleaved with the first plurality of first-parity-numbered tracks. Clearly, the first and second parities can be even and odd, or odd and even.

In one aspect, the invention provides a method of preventing data loss in a magnetic disk device. The method includes maintaining a first set of one or more first-parity-track counters and a second set of second-parity-track counters regarding write operations on first-parity-numbered tracks and second-parity-numbered tracks, and in response to a command to write data to a given first-parity-numbered track, it is determined, based at least in part on values of counters in the first and second sets, whether a criterion is met. Only if the criterion is met, data from a second-parity-numbered track is read. A counter in the first set is updated in a manner that in at least some instances depends on whether the criterion is met.

In some embodiments, the surface of the magnetic disk is divided up into areas, separate sets of counters are maintained for each area, and counters for a given area are updated in response to writes in the given area. While it is possible to keep track of writes to each individual track, preferred embodiments use a single even-track counter and a single-odd track counter for each area.

In some embodiments, the criterion according to which data from given-parity-numbered (e.g., odd-numbered) tracks are read out (for subsequent re-writing) is whether a counter representing the number of writes to an opposite-parity-numbered (in this example, even-numbered) track has reached (meets or exceeds) a threshold, and also that there is data on the given-parity-numbered tracks (counter is non-zero). As mentioned, in some embodiments, the number of writes to all the given-parity-numbered tracks (typically for a given disk area) are kept in one counter.

The purpose of reading data from the tracks in which a threshold number of writes to adjacent (i.e., opposite parity) tracks have occurred is to retrieve the data before it is irretrievably degraded, and then to rewrite it to the tracks from which it was retrieved. Some embodiments reduce the number of times data needs to be rewritten by monitoring the quality of the data by determining the number of retries necessary for reading the data, and until that number reaches a threshold, allowing further writes to the adjacent tracks before rewriting the data.

According to another aspect, the invention provides a magnetic disk device that is provided with a first set of one or more first-parity-track counters, a second set of one or more second-parity-track counters, and control circuitry that accesses and updates the first and second sets of counters. The control circuitry is configured to respond to a command to write data to a given first-parity-numbered track by determining, based at least in part on values of counters in the first and second sets, whether a criterion is met. Only if the criterion is met, does the control circuit read data from a second-parity-numbered track, and is configured to update a counter in the first set in a manner that in at least some instances depends on whether the criterion is met.

In another aspect of the present invention, there is provided a magnetic disk device comprising: a magnetic disk for recording data; a magnetic head for writing or reading the data on or from the magnetic disk; and a write and read circuit, connected to the magnetic head, for writing or reading the data; wherein the data is written or read to or from a plurality of tracks in the form of concentric circles disposed on the magnetic disk; and wherein the number of writes of data on a given track is acquired and it is detected that the number of writes reaches a predetermined number, and based on the detection, data on tracks adjacent to the given track is read out once and, then, the read-out data is rewritten to the adjacent tracks.

In another aspect of the present invention, there is provided a magnetic disk device comprising: a magnetic disk for recording data; a magnetic head for writing or reading the data on or from the magnetic disk; and a write and read circuit, connected to the magnetic head, for writing or reading the data; wherein the data is written or read to or from a plurality of tracks in the form of concentric circles disposed on the magnetic disk; and wherein all tracks on the magnetic disk are divided into a plurality of areas, the number of writes of data on even-numbered physical tracks in the divided areas is acquired and it is detected that the number of writes reaches a predetermined number, and based on the detection, data on odd-numbered physical tracks in the divided areas is read out once and, then, the read-out data is rewritten on the odd-numbered tracks.

In another aspect of the present invention, there is provided a magnetic disk device comprising: a magnetic disk for recording data; a magnetic head for writing or reading the data on or from the magnetic disk; and a write and read circuit, connected to the magnetic head, for writing or reading the data; wherein the data is written or read to or from a plurality of tracks in the form of concentric circles disposed on the magnetic disk; and wherein all tracks on the magnetic disk are divided into a plurality of areas, the number of writes of data on odd-numbered physical tracks in the divided areas is acquired and it is detected that the number of writes reaches a predetermined number, and based on the detection, data on even-numbered physical tracks in the divided areas is read out once and, then, the read-out data is rewritten on the even-numbered tracks.

Still further, the magnetic disk device may be configured such that, when the data is written on the tracks, the data is written on alternate physical tracks and every other track is skipped and, after the data is written on half of all the tracks, the data is written on the skipped tracks.

By adopting the configuration described above, according to the present invention, even under circumstances where a leakage magnetic field deletes data on adjacent tracks little by little, such deletion can be compensated so as to prevent data errors from occurring.

A further understanding of the nature and advantages of the present invention may be realized by reference to the remaining portions of the specification and the drawings.

The following table describes the reference numbers for FIGS. 2 through 7.

| | |
|---|---|
| 201 | Magnetic disk |
| 202 | Magnetic head |
| 203 | Spindle |
| 204 | Arm |
| 205 | VCM |
| 301 | Magnetic disk |
| 302 | Tracks on magnetic disk |
| 303 | Track pitch |
| 401 | Host computer |
| 402 | HDC |
| 403 | Data buffer |
| 404 | Servo controller |
| 405 | R/W channel |
| 406 | R/W amplifier |
| 407 | Write head |
| 408 | Read head |
| 409 | Magnetic disk |
| 410 | MPU |
| 501 | Write head lower magnetic pole piece |
| 502 | Write head upper magnetic pole piece |
| 503 | Write head coil |
| 504 | Write head floating upper surface portion |
| 505 | Write head side surface portions |
| 601, 701 | Track on magnetic disk |

DESCRIPTION OF SPECIFIC EMBODIMENTS

As summarized above, the present invention provides techniques for preventing data loss on a magnetic disk device, especially data loss in one track due to a leakage magnetic field that occurs during a write operation to an adjacent track. However, recognizing that preventing leakage fields imposes other limitations, the invention provides techniques to monitor circumstances where the data could become degraded, and regenerate the data before irreparable data loss occurs. More specifically, in some embodiments, when the number of data writes on a magnetic disk surface reaches a predetermined number, on the assumption that it may be adjacent to the track in question is about to be deleted, the data is refreshed (say by reading the data on the adjacent track once and, then, rewriting the data on the same track.

Figure 6:
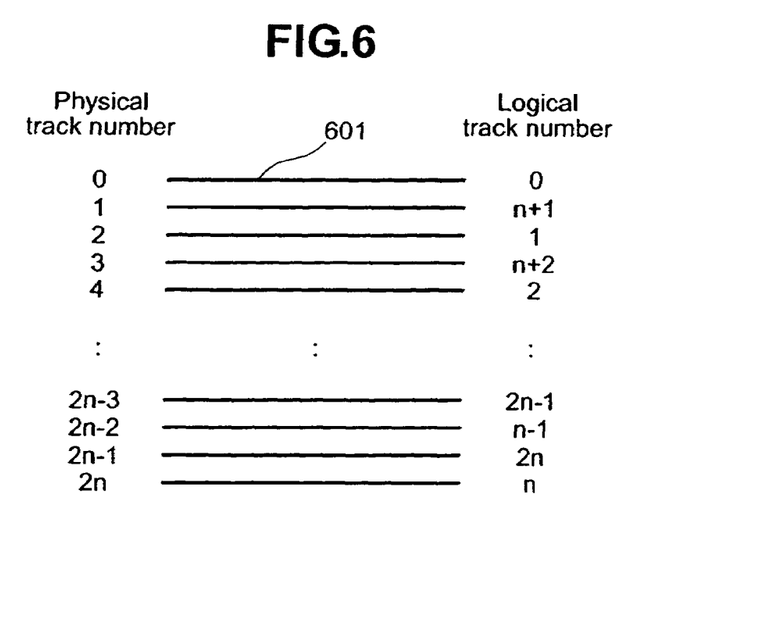
FIG. 6 shows a correspondence between physical track numbers and logical track numbers on a magnetic disk in one exemplary embodiment of the present invention.
Figure 7:
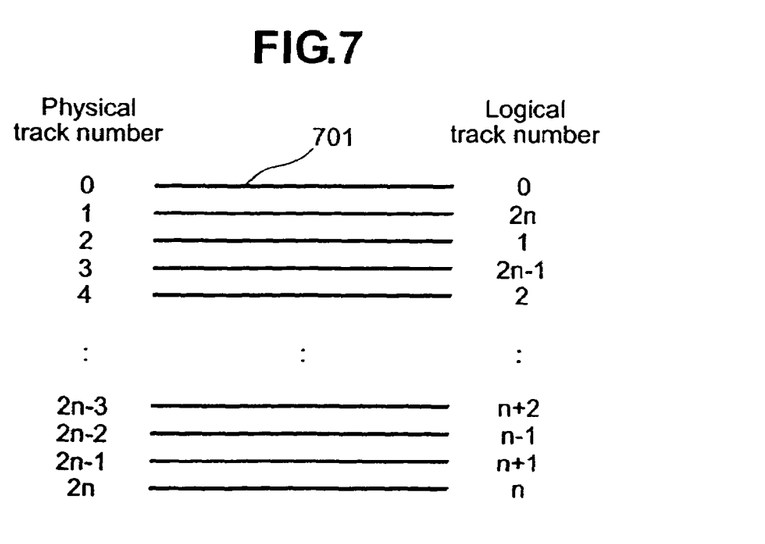
FIG. 7 shows a correspondence between physical track numbers and logical track numbers on a magnetic disk in another exemplary embodiment of the present invention.

FIG. 6 is a diagram showing an example of a correspondence between physical track numbers and logical track numbers on a magnetic disk. FIG. 7 is a diagram showing another example of a correspondence between physical track numbers and logical track numbers on a magnetic disk. According to these embodiments, when data is written on a magnetic disk surface, it is defined in advance that the data is written on alternate physical tracks. More specifically, the physical track numbers are associated with the logical track numbers as shown in FIGS. 6 and 7, wherein the logical track numbers indicate the order when the magnetic disk device is actually used.

When the physical track numbers are associated with the logical track numbers as shown in FIGS. 6 and 7, the data is written on the magnetic disk surface in the order of 0, 2, 4, ... of the physical track numbers. In the case in which there are 2n tracks in all shown in FIGS. 6 and 7, when up to half of the capacity is used or not more than n tracks are used, the data is not written on adjacent tracks and, therefore, even when the data is written repeatedly, there is no possibility that the adjacent tracks are deleted by the leakage magnetic field and it is not necessary to refresh the data.

While it is more natural to have logical track 0 correspond to physical track 0, it is also possible to have logical track 0 correspond to an odd-numbered physical track, say physical track 1, so that the data is first written to physical tracks 1, 3, 5, ... rather than to the even-numbered tracks as mentioned above and shown in FIGS. 6 and 7. Thus, what is significant is that the data is first written to alternate tracks (having physical track numbers of the same parity, namely odd or even).

Further, the number of writes on each magnetic disk may be recorded for both even-and odd-numbered physical tracks separately. In this case, for example, when the number of writes on the even-numbered physical tracks reaches the predetermined number, it is needed only to refresh the data on the odd-numbered physical tracks and, conversely, when the number of writes on the odd-numbered physical tracks reaches a predetermined number, it is needed only to refresh the data on the even-numbered physical tracks and, consequently, the time required to refresh the data can be reduced.

Figure 8:
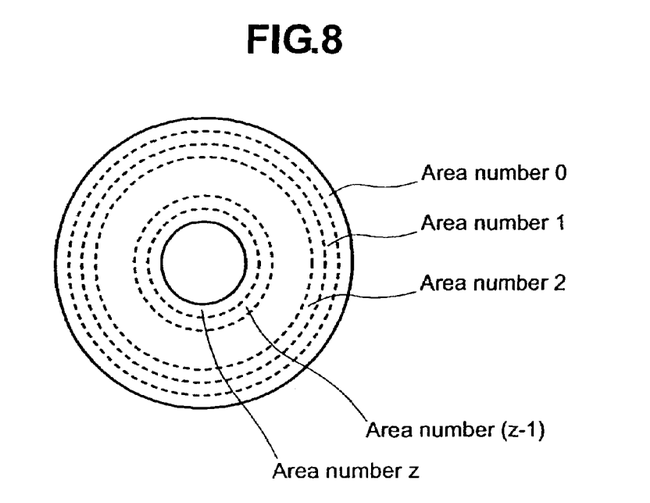
FIG. 8 is a diagram showing an exemplary configuration in which a magnetic disk surface is divided into a plurality of areas according to an embodiment of the present invention.

The refresh of the data is preferably performed while operations in response to commands from the host are not being performed. However, given that operations in response to commands from the host are frequent, it is recognized that it is difficult to refresh the data on all disk surfaces at one time. Thus, according to this embodiment, each disk surface is divided into several areas as shown in FIG. 8 and the number of writes of the data for each area is recorded and, then, it is determined whether or not a refreshing operation is needed for each area.

In other words, an aspect of the present invention is to monitor the number of writes for each track and to refresh the data on the tracks adjacent to the monitored tracks before the data has a chance to be lost. Further, the data is recorded on alternate physical tracks and, after half of all the tracks have been occupied, the data is written on the tracks that have been skipped. More specifically, considering the fact that it is normally not practical in terms of memory management to the enormous number of tracks on an individual basis, the magnetic disk surfaces are divided into areas and the number of writes and the refresh of the data is managed for each area. In this case, it is needed only to refresh the data on the restricted number of tracks, and therefore avoid refreshing the areas that do not need to be refreshed.

Figure 9:
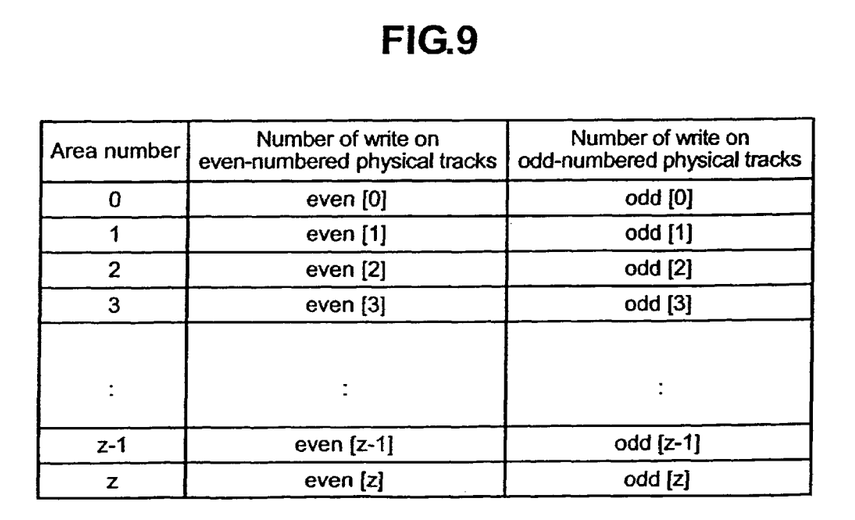
FIG. 9 is a diagram showing a state in which the number of writes on both even- or odd-numbered physical tracks is recorded on a memory for each area on a given magnetic disk surface according to an embodiment of the present invention.

FIG. 9 is a diagram showing a state in which the number of writes on both even- or odd-numbered physical tracks is recorded on a memory for each area on a given magnetic disk surface according to this embodiment. In the following description, it is assumed that the tracks are designated by the physical track numbers, even unless explicitly stated. In a specific example shown in FIGS. 8 and 9, in which one disk surface may be divided into about 10 areas, if one magnetic disk surface includes 40,000–50,000 tracks in all, each area should include 4000–5000 tracks. In FIG. 9, even [1] refers to a variation indicating the number of writes on even-numbered physical tracks residing in the area number 1 and this value is recorded on the memory as, for example, even [1] 900. Here, although the number of writes is not always equal among all even-numbered tracks in the area number 1, it may be reasonable to record the maximum value of the number of writes on any one track in the area number 1.

The magnetic disk device having a plurality of magnetic disk surfaces is provided with the tables as shown in FIG. 9 as many as the magnetic disk surfaces. The number of writes on the even-numbered tracks in the area y is stored in even [y] and the number of writes on the odd-numbered tracks in the area y is stored in odd [y]. When the magnetic disk device is shipped, all these values are 0.

Since the values in the tables shown in FIG. 9 must be held even while the magnetic disk device is de-energized, these values are recorded, for example, in a Flash memory or on the magnetic disk surface. However, as these values of the number of writes are read or updated frequently while the magnetic disk device is in operation, it is preferable that these values are transferred to, and maintained in, a memory such as a RAM that can be read and written at high speed during operation of the magnetic disk device.

In this case, when the magnetic disk device is activated, the values of the number of writes up to the previous time that have been recorded in the non-volatile memory are read and, then, the values are put on the RAM and, then, while the magnetic disk device is in operation, the values on the RAM are read or updated. Then, before the magnetic disk device is de-energized, the values on the RAM are rewritten in the non-volatile memory. Since there is a possibility that the magnetic disk device is de-energized suddenly, it is preferable to save the values on the RAM to the non-volatile memory not only at the moment when the magnetic disk device is turned off but also from time to time.

Figure 1:
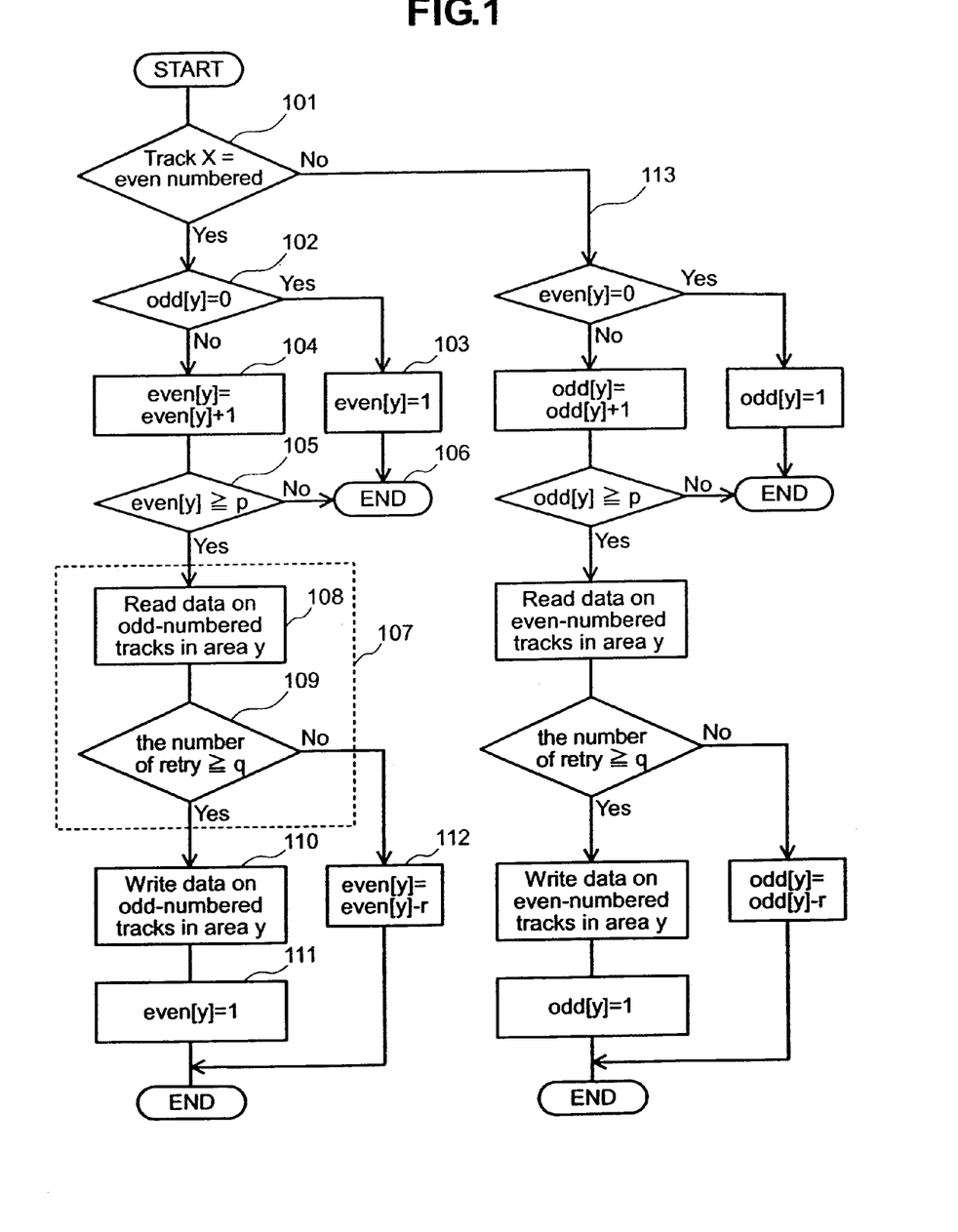
FIG. 1 is a flow chart illustrating a procedure for refreshing data when the data is written on a track x in an area y on a magnetic disk surface in a magnetic disk device according to an embodiment of the present invention.

Next, a procedure for refreshing data according to the embodiment of the present invention will be described. FIG. 1 shows a procedure for determining whether a data refresh process is needed or not when data is written on a track x and a procedure after the refresh process is performed. Here, it is assumed that the track x belongs to an area y in the following description.

First, in step 101, it is determined whether the track x is even-numbered or odd-numbered. The following description will be given on the assumption that the track x is even-numbered. Next, in step 102, it is determined whether or not the data has been written on adjacent tracks. If odd [y]=0, this means that the data has not been written at all on odd-numbered tracks in the area y. In such a case, no matter how many times the data has been written on the even-numbered tracks, it is not necessary to consider a possibility that the data on the adjacent tracks is deleted by a leakage magnetic field. That is, the number of writes on the even-numbered tracks is insignificant, the process proceeds to step 103, the value of even [y] is set to 1, and the process in ended (step 106). If odd [y] is not 0, i.e., if the data has already been written on the odd-numbered tracks, the process proceeds to step 104 and the value of even [y] is incremented by 1 (the number of writes on the even-numbered tracks in the area y is incremented by 1).

If the value of even [y] is updated, there is a possibility that the number of writes on the even-numbered tracks reaches the value at which the refresh is required. Therefore, the number of writes on the even-numbered tracks is determined in step 105 in this embodiment. More specifically, in this case, it is determined whether the number of writes on the even-numbered tracks has reached a threshold value p at which the refresh is needed. If the value of even [y] is less than the threshold value p, it is determined that the refresh is not needed and the process in ended (step 106). However, if the value of even [y] is not less than the threshold value p, it is determined that there is a possibility that the refresh is needed and the process continues.

When the number of writes on the even-numbered tracks in the area y reaches the threshold value p, the refresh process may be performed at once or, alternatively, another procedure shown in step 107 (see steps in a dotted box in FIG. 1) may be taken wherein the data on the odd-numbered tracks in the area y, which has been written temporarily to refresh the data, is read out once (step 108) and, then, if the number of retry attempts exceeds a predetermined value, it is determined that the data is actually about to be deleted (step 109) and the data is rewritten. In a typical magnetic disk device, if the data is not read properly in the first read operation, the retry attempts are performed to read the data in the same portion repeatedly up to a few tens or a hundred times until the data is read properly and, then, if the data has not been failed completely, the data may often be read by the retry attempts.

In FIG. 1, when the data on the odd-numbered tracks in the area y in question is read, if the number of retry attempts reaches a predetermined value q, it is determined that the data in the area becomes less readable in actuality in step 109. Then, if it is determined that the data must be rewritten, the data is rewritten in step 110 (the data on all the odd-numbered tracks in the area y is rewritten). If the number of retry attempts is small and it is determined that the refresh is not needed yet, the data is not rewritten. In the case where the data is not rewritten, it is preferable that the data that has been read once is stored on a high-speed memory such as RAM temporarily until it is determined whether the data must be rewritten so that it would not be necessary to read the data in the area in question that has been read once again (so that it would not be necessary to repeat step 108) when it would be determined that the data must be rewritten actually (for example, when the threshold value p is reached in step 105).

When the process shown in step 107 is not performed, it will be more cost effective if the refresh is performed, not by the procedure in which all the data in the area to be refreshed is read out once and then rewritten, but by the procedure in which the data is read and then written at once by small blocks (for example, by 100 tracks/block instead of 4000–5000 tracks/area) repeatedly, because it is not necessary to prepare the large-capacity memory to store the read data until it is rewritten in the latter case.

If it is determined that the data must be refreshed in step 109 and the rewrite is actually performed in step 110, the number of writes on the even-numbered tracks can be reset to 1 (step 111).

On the other hand, in the case where the number of writes exceeds the threshold value p but it is determined that the refresh is still not needed in step 109 and the rewrite process is not performed, when the data is written on the even-numbered tracks in the area y in question next time, it will be determined that the refresh is needed again. Here, the checking procedure by reading the data before rewriting as shown in step 107 may be performed. More specifically, the procedure in which the refresh process is not performed soon after the number of writes reaches the threshold value p but it is determined whether the refresh is needed or not after the data is read out once may be adopted. In this case, if the value of even [y] remains unchanged, even [y] is always not less than p until the data in the area in question is refreshed and, therefore, every time when the data is written on the even-numbered tracks in the area in question at least once, the read checking procedure for determining whether the refresh is needed must be performed inevitably.

It typically does not happen that the data on a track, which has been able to be read without problems, becomes unreadable suddenly after one write operation on the adjacent tracks. It therefore seems to be no problem that it is not determined whether the refresh operation is needed or not for the predetermined number of times after the read checking procedure is performed (in step 109) once.

Therefore, after it is determined whether the refresh is needed or not once in steps 108 and 109, the process is configured so that the read operation to check whether the refresh is needed or not is not performed until the write operation is performed over r times. Such configuration is implemented in step 112. As shown in step 112, by subtracting r from the value of even [y] in advance, the condition even [y]≧p is not satisfied in step 105 until the data is written on the even-numbered tracks in the area y over r times. Therefore, the read checking procedure to determine whether the refresh is needed or not is not performed meanwhile. This inhibits that the read checking procedure (108) to determine whether the refresh is needed or not is performed too frequently. More specifically, assuming that p=1000 in step 105 and r=100 in step 112, even [y]=1000−100=900 is obtained in step 112 and even [y]=900 is obtained in step 104. Therefore, the condition even [y]≧p is not satisfied in step 105 while the data is written on the even-numbered tracks over 100 times and, consequently, it is not necessary to read the odd-numbered tracks in the area y (step 108) meanwhile.

Since optimal values for p, q and r as described above may vary depending on the combination of the magnetic disks and heads used actually or the write current value, it is preferable that the values of p, q and r may be variable parameters defined separately for each disk surface or each area.

In FIG. 1, if the track x is an odd-numbered track, the process goes from step 101 to step 113 but, after that, the process is similar to the one described with reference to the left side of FIG. 1, although the even-numbered tracks are substituted by the odd-numbered tracks.

As described above, some embodiments provide the configuration and functions or operations as follows. The number of writes is counted and, if the number of writes exceeds a predetermined number, the refresh operation to read once and then write the data is performed. Here, logical track numbers are assigned to alternate physical tracks and the number of writes is counted separately for even-numbered and odd-numbered physical tracks.

By adopting such a configuration, it is needed only to refresh the data on either the even-numbered or the odd-numbered physical tracks and, therefore, the time required to refresh the data can be reduced. Further, since the logical track numbers are assigned alternately, the possibility of deleting data on adjacent tracks does not arise until half of the capacity of the entire magnetic disk is used. Further, when it is necessary to refresh the data after more than half of the entire capacity has been used, the data can be recovered for a shorter time and more effectively.

Still further, in embodiments where the disk surfaces of the recording media are divided into a plurality of areas and counting the number of writes for each of the plurality of areas, the data subject to the refresh operation can be restricted and the time required for the refresh operation can be saved.

While the above is a complete description of specific embodiments of the invention, the above description should not be taken as limiting the scope of the invention as defined by the claims.

What is claimed is:

1. A method of preventing data loss in a magnetic disk device where a magnetic head writes data on concentric tracks on a surface of a magnetic disk, the tracks including a first plurality of first-parity-numbered tracks and a second plurality of second-parity-numbered tracks interleaved with the first plurality of first-parity-numbered tracks, the method comprising:

maintaining a first set of one or more first-parity-track counters and a second set of second-parity-track counters regarding write operations on first-parity-numbered tracks and second-parity-numbered tracks; and in response to a command to write data to a given first-parity-numbered track, determining, based at least in part on values of counters in the first and second sets, whether a criterion is met; only if the criterion is met, reading data from a second-parity-numbered track; and updating a counter in the first set in a manner that in at least some instances depends on whether the criterion is met;

if data is read from a second-parity-numbered track, determining a number of retries necessary for reading the data; and if the number of retries reaches a threshold, writing the data read from one or more second-parity-numbered tracks to one or more second-parity-numbered tracks.

2. The method of claim 1 wherein:

the first and second pluralities of tracks are located in a disk area and constitute a fraction of a total number of tracks on the surface of the magnetic disk;

the method further comprises maintaining respective first and second additional sets of counters used to prevent data loss in an additional plurality of first-parity-numbered tracks interleaved with an additional plurality of second-parity-numbered tracks located in a different disk area.

3. The method of claim 1 wherein:

the first and second sets of counters each contain a single counter;

the criterion is that the counter in the second set is non-zero, and the counter in the first set has reached a threshold.

4. The method of claim 1 wherein:

the criterion is that at least one second-parity-numbered track have been written, and the number of writes to first-parity-numbered tracks has reached a threshold.

5. The method of claim 1 wherein, if data is written to second-parity-numbered tracks, updating a counter in the first set includes setting the counter to a value signifying a single write to a first-parity-numbered track.

6. A method of preventing data loss in a magnetic disk device where a magnetic head writes data on concentric tracks on a surface of a magnetic disk, the tracks including a plurality of first-parity-numbered tracks interleaved with a plurality of second-parity-numbered tracks, the method comprising:

storing tracking information regarding writes to first-parity-numbered tracks and second-parity-numbered tracks;

in response to a command to write data to a given first-parity-numbered track, determining whether a criterion specifying risk to data on a second-parity-numbered track is met;

if the criterion is met, reading data from one or more second-parity-numbered tracks, and storing the data, so read;

determining a number of retries required for reading the data from second-parity-numbered tracks; and if the number of retries reaches a threshold, writing the stored data read from the second-parity-numbered tracks to the second-parity-numbered tracks.

7. A magnetic disk device comprising:

a magnetic disk having a surface;

a magnetic head for writing or reading the data on or from said surface of said magnetic disk;

a write and read circuit, connected to said magnetic head, for causing said head to write or read data; the data being written on concentric tracks on said surface of said magnetic disk, said tracks including a first plurality of first-parity-numbered tracks and a second plurality of second-parity-numbered tracks interleaved with the first plurality of first-parity-numbered tracks;

a first set of one or more first-parity-track counters;

a second set of one or more second-parity-track counters; and control circuitry that accesses and updates said first and second sets of counters, said control circuitry being configured to respond to a command to write data to a given first-parity-numbered track by determining, based at least in part on values of counters in said first and second sets, whether a criterion is met; only if the criterion is met, reading data from a second-parity-numbered track; and updating a counter in said first set in a manner that in at least some instances depends on whether the criterion is met; the control circuitry, if data is read from a second-parity-numbered track, determining a number of retries necessary for reading the data; and if the number of retries reaches a threshold, writing the data read from one or more second-parity-numbered tracks to one or more second-parity-numbered tracks.

8. The magnetic disk device of claim 7 wherein:

the first and second pluralities of tracks are located in a disk area and constitute a fraction of a total number of tracks on said surface of said magnetic disk;

the magnetic disk further comprises an additional plurality of first-parity-numbered tracks and an additional plurality of second-parity-numbered tracks interleaved with the first plurality of first-parity-numbered tracks, said additional pluralities of tracks being located in a different disk area;

the magnetic disk device further comprises first and second additional sets of counters; and said control circuitry further accesses and updates said additional first and second sets of counters, and is configured to respond to a command to write data to a given first-parity-numbered track in the different disk area by determining, based at least in part on values of counters in said first and second additional sets, whether a criterion is met; only if the criterion is met, reading data from a second-parity-numbered track in said different disk area; and updating a counter in said first additional set in a manner that in at least some instances depends on whether the criterion is met.

9. A magnetic disk device comprising:

a magnetic disk for recording data;

a magnetic head for writing or reading the data on or from the magnetic disk; and a write and read circuit, connected to the magnetic head, for writing or reading the data;

wherein the data is written or read to or from a plurality of tracks in the form of concentric circles disposed on the magnetic disk; and wherein the number of writes of data on a given track is acquired and it is detected that the number of writes reaches a predetermined number, and based on the detection, data on tracks adjacent to the given track is read out once and, then, the read-out data is rewritten to the adjacent tracks.

10. A magnetic disk device comprising:
a magnetic disk for recording data;
a magnetic head for writing or reading the data on or from the magnetic disk; and
a write and read circuit, connected to the magnetic head, for writing or reading the data;
wherein the data is written or read to or from a plurality of tracks in the form of concentric circles disposed on the magnetic disk; and
wherein all tracks on the magnetic disk are divided into a plurality of areas,
wherein the number of writes of data on even-numbered physical tracks in the divided areas is acquired and it is detected that the number of writes reaches a predetermined number, and
wherein based on the detection, data on odd-numbered physical tracks in the divided areas is read out once and, then, the read-out data is rewritten on the odd-numbered tracks.

11. A magnetic disk device comprising:
a magnetic disk for recording data;
a magnetic head for writing or reading the data on or from the magnetic disk; and
a write and read circuit, connected to the magnetic head, for writing or reading the data;
wherein the data is written or read to or from a plurality of tracks in the form of concentric circles disposed on the magnetic disk; and
wherein all tracks on the magnetic disk are divided into a plurality of areas,
wherein the number of writes of data on odd-numbered physical tracks in the divided areas is acquired and it is detected that the number of writes reaches a predetermined number, and
wherein based on the detection, data on even-numbered physical tracks in the divided areas is read out once and, then, the read-out data is rewritten on the even-numbered tracks.

12. A magnetic disk device according to claim 10, wherein, when the read-out data is rewritten on the odd-numbered tracks, the number of writes on the even-numbered physical tracks is cleared.

13. The magnetic disk device of claim 11, wherein, when the read-out data is rewritten on the even-numbered tracks, the number of writes on the odd-numbered physical tracks is cleared.

14. The magnetic disk device of any one of claims 9, 10, 11, 12, or 13 wherein, when data is written on the tracks, the data is written on alternate physical tracks and every other track is skipped and, after the data is written on half of all the tracks, the data is written on the skipped tracks.

* * * * *